United States Patent
Russell et al.

(10) Patent No.: US 8,739,165 B2
(45) Date of Patent: May 27, 2014

(54) SHARED RESOURCE BASED THREAD SCHEDULING WITH AFFINITY AND/OR SELECTABLE CRITERIA

(75) Inventors: Andrew C. Russell, Austin, TX (US); William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 935 days.

(21) Appl. No.: 12/017,988

(22) Filed: Jan. 22, 2008

(65) Prior Publication Data

US 2009/0187909 A1 Jul. 23, 2009

(51) Int. Cl.
*G06F 9/46* (2006.01)

(52) U.S. Cl.
USPC .......................................... 718/102

(58) Field of Classification Search
USPC .......................................... 718/102
See application file for complete search history.

(56) References Cited

U.S. PATENT DOCUMENTS

| | | | |
|---|---|---|---|
| 6,243,788 B1 | 6/2001 | Franke et al. | |
| 6,269,390 B1 * | 7/2001 | Boland | 718/100 |
| 6,289,369 B1 | 9/2001 | Sundaresan | |
| 6,553,513 B1 | 4/2003 | Swoboda et al. | |
| 6,902,511 B2 * | 6/2005 | Shimizu et al. | 477/4 |
| 7,143,412 B2 * | 11/2006 | Koenen | 718/102 |
| 7,275,249 B1 * | 9/2007 | Miller et al. | 718/105 |
| 7,831,980 B2 * | 11/2010 | Accapadi et al. | 718/108 |
| 7,865,895 B2 * | 1/2011 | Anand et al. | 718/102 |
| 2004/0054999 A1 * | 3/2004 | Willen et al. | 718/103 |
| 2004/0068730 A1 * | 4/2004 | Miller et al. | 718/106 |
| 2004/0199919 A1 * | 10/2004 | Tovinkere | 718/102 |
| 2006/0107262 A1 | 5/2006 | Bodas et al. | |
| 2006/0123251 A1 | 6/2006 | Nakajima et al. | |
| 2008/0172668 A1 * | 7/2008 | Tzruya | 718/101 |
| 2009/0007120 A1 * | 1/2009 | Fenger et al. | 718/102 |
| 2009/0031318 A1 * | 1/2009 | Gopalan et al. | 718/103 |

* cited by examiner

*Primary Examiner* — Diem Cao (57) ABSTRACT

Threads may be scheduled to be executed by one or more cores depending upon whether it is more desirable to minimize power or to maximize performance. If minimum power is desired, threads may be schedule so that the active devices are most shared; this will minimize the number of active devices at the expense of performance. On the other hand, if maximum performance is desired, threads may be scheduled so that active devices are least shared. As a result, threads will have more active devices to themselves, resulting in greater performance at the expense of additional power consumption. Thread affinity with a core may also be taken into consideration when scheduling threads in order to improve the power consumption and/or performance of an apparatus.

20 Claims, 3 Drawing Sheets

SHARED RESOURCE BASED THREAD SCHEDULING WITH AFFINITY AND/OR SELECTABLE CRITERIA

BACKGROUND

1. Field

This disclosure relates generally to thread scheduling, and more specifically, to shared resource based thread scheduling with affinity and/or selectable criteria.

2. Related Art

In multi-core data processing systems with shared resources, how threads are scheduled to the cores can have a very significant impact on the behavior and performance of the system. Thread scheduling is thus very important in systems having a plurality of cores or processors.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one embodiment, threads (each comprising one or more processor instructions) are scheduled depending upon whether it is more desirable to minimize system power or to maximize thread performance. In this embodiment, if minimum system power is desired, threads may be scheduled so that resources or active devices (e.g. 40-41, 50-53, 70-71, 150-151, 140 of FIGS. 2 and 3) are most shared; this will minimize the number of active devices at the expense of performance. However, for some embodiments, thread affinity will also be taken into consideration when scheduling threads to minimize power. For some embodiments, if thread affinity is ignored when scheduling threads, more power could be consumed than desired.

On the other hand, if maximum thread performance is desired (e.g. execute the thread as fast as possible), threads may be scheduled so that resources or active devices (e.g. 40-41, 50-53, 70-71, 150-151, 140 of FIGS. 2 and 3) are least shared. As a result, threads will have more resources or active devices to themselves, resulting in greater performance at the expense of additional power usage or consumption. In one embodiment, this approach may maximize the number of resources being used (i.e. active devices). However, for some embodiments, thread affinity will also be taken into consideration when scheduling threads to maximize performance. For some embodiments, if thread affinity is ignored when scheduling threads, thread performance could be degraded.

One example of a factor that affects thread affinity is how much of the data and/or instructions to be used when executing the thread are currently stored in a cache (e.g. L2 cache 40-41, 140) that is used by the available core (e.g. 50-53, 150-151). For example, if the data to be used when executing a thread is stored in L2 cache 40 of FIG. 2, then the thread would have a higher affinity for cores 50 and 51 than for cores 52 and 53 that do not use L2 cache 40. This is because cores 50 and 51 can efficiently retrieve the data needed to execute the thread from L2 cache 40. Cores 52 and 53 would have to retrieve the data needed to execute the thread from other circuitry 70 or even possibly from external to apparatus 60 by way of bus 74, interface 71 and bus 73. Such accesses to other circuitry 70 and to storage circuitry (not shown) external to apparatus 60 consume more time and power than accesses to L2 cache 40.

In one embodiment, core affinity circuitry 63 (see FIG. 2) may be used to determine an affinity value for a thread in relation to an available core (e.g. 50) based upon whether information for that thread is stored in the associated cache (e.g. L2 cache 40) used by that available core (e.g. 50). In one embodiment, the affinity value increases as the percentage of information required by the thread and stored in the core's cache increases. In one embodiment, a thread's affinity value may be proportional to a number of cache lines used by that thread that still reside or are stored in the core's associated cache (e.g. L2 cache 40 for core 50). Note that a thread's affinity value is usually dynamic in nature since a thread's affinity for a core will decrease in time as the thread's cache lines are replaced or overwritten in the core's associated cache when the thread is not active, and other threads are utilizing the core's associated cache.

In one embodiment, a thread's affinity for a core can be determined in a wide variety of ways. In some embodiments, if a thread has never been executed before, the thread's affinity for all cores may be zero. In one embodiment, if the cache that an idle thread used has been invalidated, then that thread's affinity for that core or its associated cache may be set to zero. Some embodiments may count the number of cache lines loaded into a cache by a particular thread. That thread's affinity for a core can then be determined by the number of cache lines used by that thread that still remain in the core's cache. In some embodiments, if a thread was the last thread to execute on a core, then that thread may still have a high affinity value for that core since its data and/or instructions still remain in the core's cache(s). However, if several threads have executed on that core since that particular thread last executed, then it is likely that that particular thread no longer has a strong affinity (e.g. high affinity value) for that core since the other subsequent threads have likely caused that particular thread's data and/or instructions to be overwritten in the cache(s). Thus, for some embodiments, another measure of affinity for a specific thread to a core may be determined at least in part based on the number of other threads that have been actively executing on the core since the specific thread was active on that core, or determined, at least in part, by the duration of execution of one or more threads other than the specific thread on a core since the specific thread was active on that core.

For some embodiments, the circuitry may count the number of writes by other threads to a cache last used by a particular thread. As the number of writes to the cache by other threads increases, it becomes more likely that that particular thread's data and/or instructions have been overwritten in the cache(s). Thus for some embodiments, the affinity value of a thread for a core may be a function of the number of writes to one or more caches used by the core. For some embodiments, writes to a core's cache are counted only after the first execution of the thread on that core, and the count number is reset to zero each time that that thread is executed on that same core. In one embodiment, the cache replacement algorithm may be tracked in order to track how much information required by a thread is stored in an available core's cache. Alternate embodiments may determine an affinity value for a thread in a different manner. For example, alternate embodiments may determine thread affinity by considering other factors in addition to or instead of what is stored in a cache. For example, alternate embodiments may use a timer (not shown) to take into account how recently the same thread was executed by a core. The approaches described herein are merely some of the many possible approaches that may be used to determine an affinity value between a thread and a core.

Figure 2:
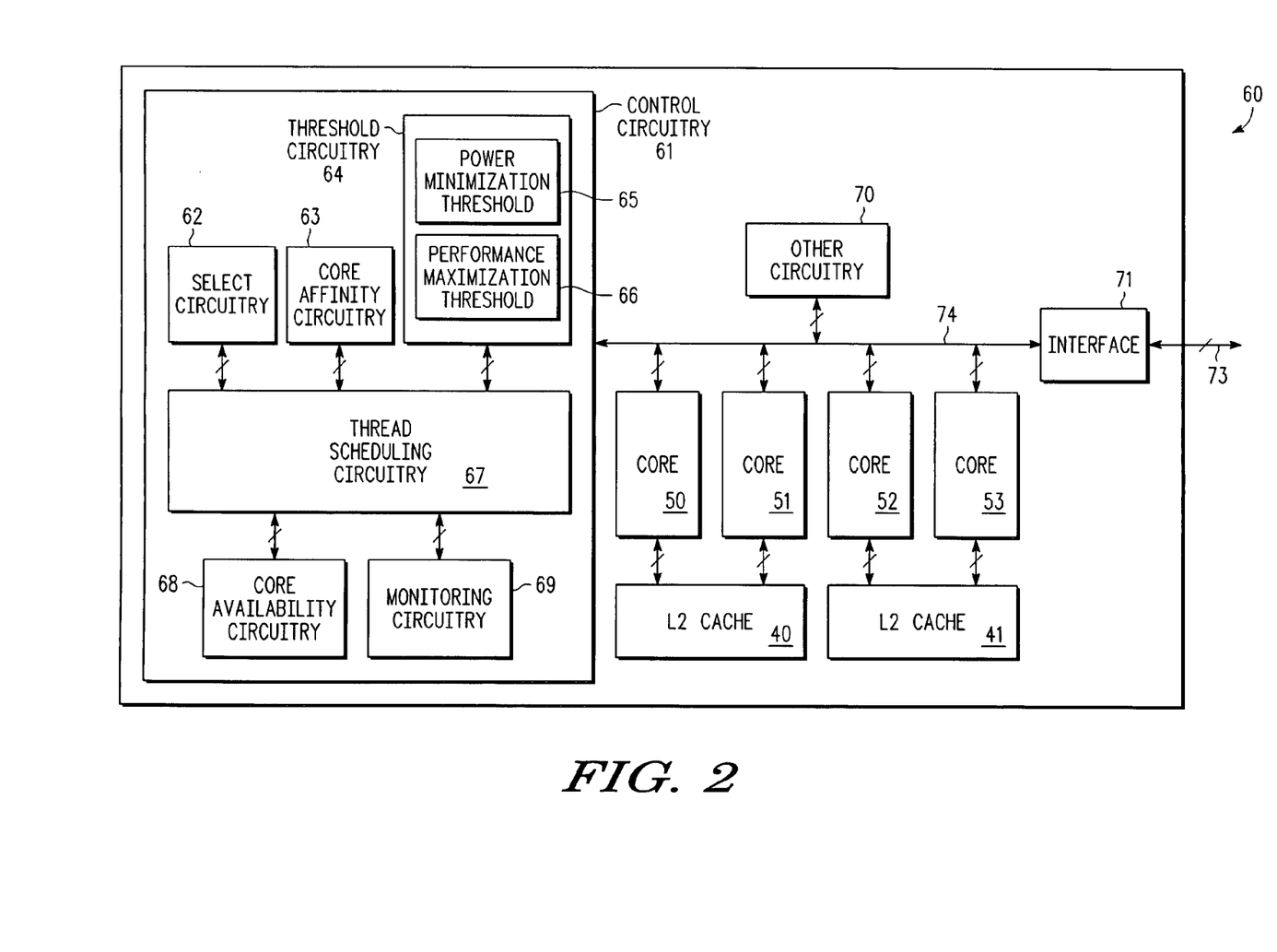
FIG. 2 illustrates, in block diagram form, an apparatus in accordance with one embodiment.
Figure 3:
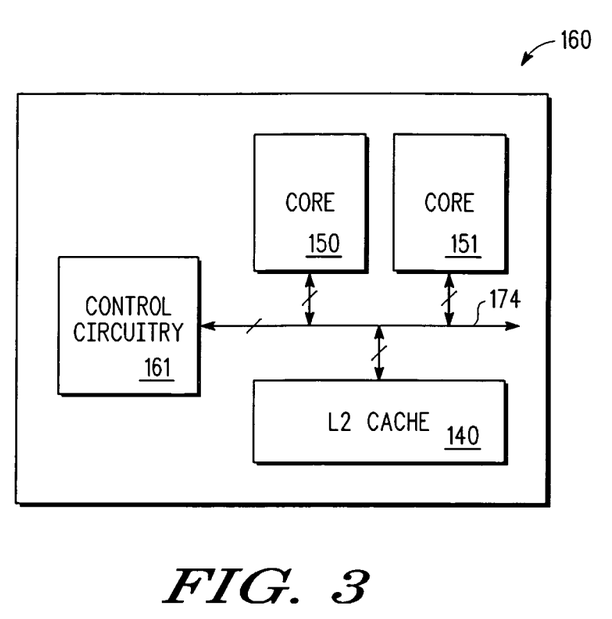
FIG. 3 illustrates, in block diagram form, an apparatus in accordance with an alternate embodiment.

Alternate embodiments of apparatus 60 and 160 of FIGS. 2 and 3 may have one or more caches associated with a core. For example, core 50 may also use an L1 cache (not shown). If a core uses a plurality of caches, a thread's affinity value for a particular core may be based on one or more of its associated caches. For example, in one embodiment, if a core uses an instruction cache and a data cache, the thread's affinity value for that particular core may be based on the thread's remaining (i.e. non-replaced) number of cache lines in both its associated instruction cache and its associated data cache. Alternate embodiments may instead have separate thread affinity values for each cache associated with a core. In one embodiment, if a thread's affinity value for any of the core's caches is below a minimum threshold value, then that core may be passed over and not chosen to execute that thread at that time. In one embodiment, if all available cores have been passed over, the core having the highest affinity value or values for that thread may be chosen, even though that core's affinity value is below the threshold. Alternate embodiments may handle multiple caches per core in a different manner.

Note that if an appropriate combination of criteria is not used, or if the appropriate combination of criteria is used incorrectly, the behavior (e.g. power consumption, performance, etc.) of apparatus 60, 160 may be detrimentally affected. It is thus very important to design a method (e.g. flow 10 of FIG. 1) that optimizes the behavior of a wide variety of threads, and even hopefully optimizes the behavior for all possible types of threads to be executed by apparatus 60 and 160 (see FIGS. 2 and 3). In addition, for some embodiments, the thread scheduling method may be modified (e.g. under software and/or hardware control) based upon changes in the system (e.g. 60, 160). For example, if apparatus or device 60 or 160 is operating using a battery as a power source, it may be advantageous to minimize power consumption. On the other hand, if apparatus or device 60 or 160 is plugged in and using an A/C supply as a power source to operate, it may be more advantageous to maximize performance and it may be less important to minimize power consumption. As a result, for some embodiments, it may be advantageous to be able to dynamically or programmably change the criteria that is selected to be optimized (e.g. power consumption, performance, etc.)

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Figure 1:
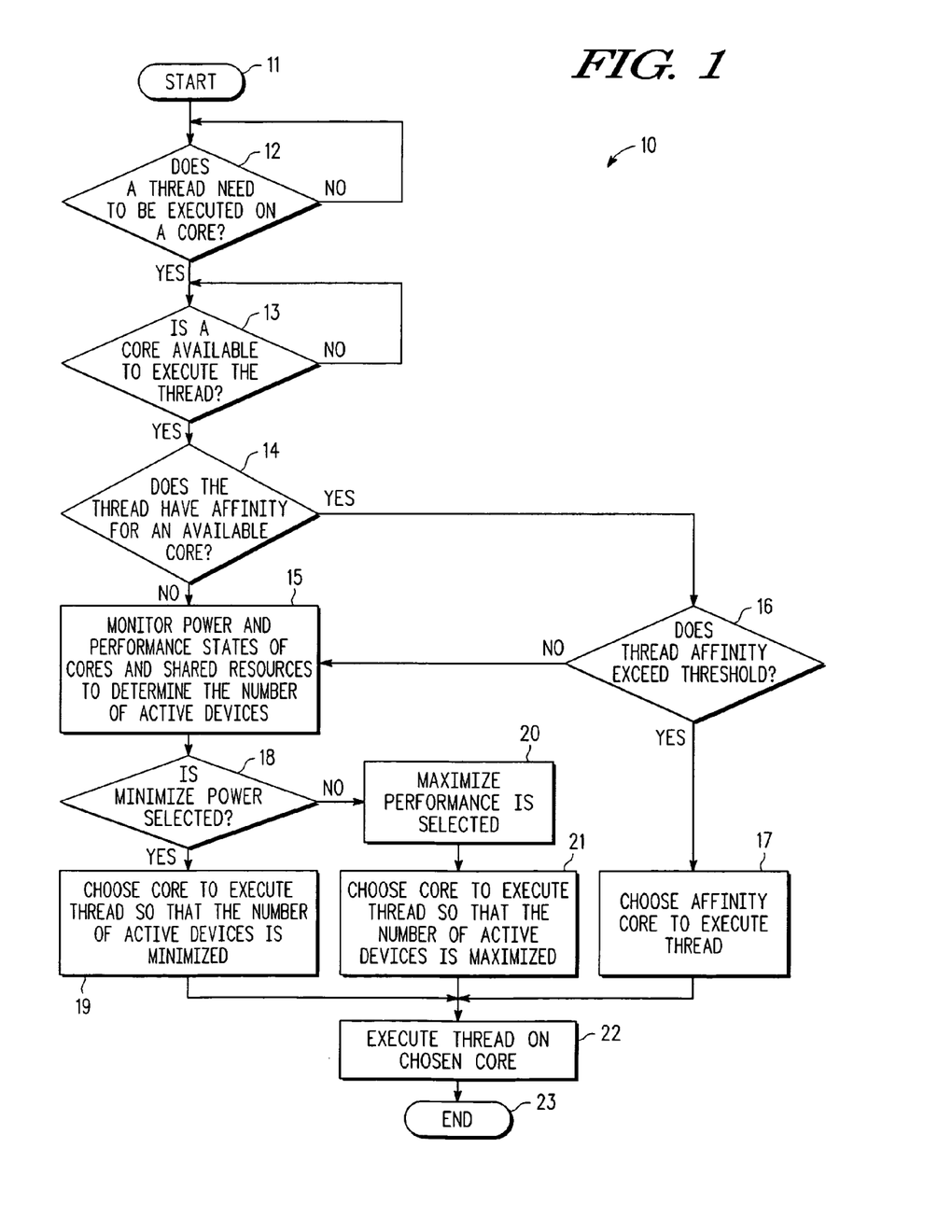
FIG. 1 illustrates, in flow diagram form, an exemplary method of using or operating circuitry in accordance with one embodiment.

FIG. 1 illustrates, in flow diagram form, an exemplary method 10 of using or operating circuitry in accordance with one embodiment. For one embodiment, control circuitry 61 (see FIG. 2) may be used to control execution of the method illustrated in FIG. 1. In another embodiment, an operating system may be used to control the execution of the method illustrated in FIG. 1. The operating system may work in concert with all or some portions of control circuitry 61 to implement method 10. For example, the operating system may utilize monitoring circuitry 69 to track the number of cache lines that reside in a cache for a given thread. In one embodiment, flow 10 begins at start oval 11. From start oval 11, flow 10 proceeds to decision diamond 12 where the question is asked "does a thread need to be executed on a core?". If the answer at decision diamond 12 is NO, then there is no thread that is currently waiting to be executed, and flow 10 continues to ask the question in decision diamond 12 until the answer is YES. If the answer at decision diamond 12 is YES, then there is a thread that is currently waiting to be executed and flow 10 proceeds to decision diamond 13 wherein the question is asked "is a core available to execute the thread?". If the answer at decision diamond 13 is NO, then there is no core currently available to execute the thread, and flow 10 continues to ask the question in decision diamond 13 until the answer is YES. If the answer at decision diamond 13 is YES, then there is a core available to execute the thread, and flow 10 proceeds to decision diamond 14 wherein the question is asked "does the thread have affinity for an available core?".

If the answer at decision diamond 14 is YES, then the thread awaiting execution does have an affinity for an available core, and flow 10 proceeds to decision diamond 16 wherein the question is asked "does the thread affinity exceed threshold?". If the answer at decision diamond 16 is NO, then the affinity of the thread awaiting execution does not exceed a threshold value, and flow 10 proceeds to block 15. If the answer at decision diamond 16 is YES, then the affinity of the thread awaiting execution does exceed the threshold value, and flow 10 proceeds to block 17 where the step "choose affinity core to execute thread" is performed. Note that at step 17, the available core that has an affinity with the thread is chosen to execute the thread, provided that the thread's affinity to the available core exceeds a threshold value. From step 17, flow 10 proceeds to step 22.

If the answer at decision diamond 14 is NO, then the thread awaiting execution does not have affinity for an available core and flow 10 proceeds to block 15 where the step "monitor power and performance states of cores and shared resources to determine the number of active devices" is performed. From step 15, flow 10 proceeds to decision diamond 18 where the question is asked "is minimize power selected?". If the answer at decision diamond 18 is YES, then flow 10 proceeds to block 19 where the step "choose core to execute thread so that the number of active devices is minimized" is performed. From step 19, flow 10 proceeds to step 22. If the answer at decision diamond 18 is NO, then flow 10 proceeds to block 20 where is it recognized that "maximize performance is selected". From block 20, flow 10 proceeds to block 21 where the step "choose core to execute thread so that the number of active devices is maximized" is performed. From step 21, flow 10 proceeds to step 22.

Step 19 chooses a core to execute the thread so that the number of active devices is minimized (to minimize power); step 21 chooses a core to execute the thread so that the number of active devices is maximized (maximize performance); and step 17 chooses a core to execute the thread such that the thread has an affinity for the chosen core, wherein the thread's affinity exceeds a threshold value (choose a core that will execute the thread more efficiently). From steps 17, 19, and 21, flow 10 proceeds to block 22 where the step is performed "execute thread on chosen core". From step 22, flow 10 proceeds to oval 23 where the flow ends. Note that for many embodiments, flow 10 may loop back to the beginning from step 22 to decision diamond 12.

Alternate embodiments may use a different flow than flow 10. Flow 10 is just one possible embodiment. The flow 10 illustrated in FIG. 1 uses "minimize power", "maximize performance", and "thread affinity" as three possible criteria to be used to select a core to execute a thread. However, alternate embodiments may use more, fewer, or different criteria or characteristics for choosing which core or cores are to be used to execute a thread. For example, if one or more cores has different characteristics (e.g. a larger register bank, a smaller cache, special functional circuitry) those different characteristics may be taken into account as part of the criteria for choosing which core or cores are to be used to execute a thread. Various embodiments may cover any desired criteria for choosing which core or cores are to be used to execute a thread. In addition, various embodiments may perform the various steps 12-22 or alternate steps in a different order than the order illustrated as an example in FIG. 1. Also, although the embodiment illustrated in FIG. 1 assumes that only one core will be chosen to execute a thread, alternate embodiments may parse the execution of a thread into multiple portions that may be executed on one or more different cores, either concurrently or sequentially. In another embodiment, thread affinity may not be taken into account when scheduling threads so that decision diamond 14 and 16 and step 17 would be removed from flow 10 and decision diamond 13 would proceed to step 15 if the answer is YES.

In alternate embodiments, a thread may be embodied as instructions executed by a processor, may be embodied as a portion of software, may be embodied as values stored in storage circuitry (e.g. memory), may be embodied as electrical signals transferred by way of one or more conductors (e.g. 74, 174), or may be embodied in any other appropriate manner.

FIG. 2 illustrates, in block diagram form, an apparatus 60 capable of performing flow 10 of FIG. 1 in accordance with one embodiment. In the illustrated embodiment of FIG. 2, apparatus 60 comprises control circuitry 61, cores 50-53, other circuitry 70, and interface 71, which are bi-directionally coupled by way of bus 74. In alternate embodiments, various portions or blocks of circuitry in apparatus 60 may be coupled more or less directly. For example, in an alternate embodiment, L2 caches 40 and 41 may be bi-directionally coupled to control circuitry 61 by way of bus 74 without passing through the circuitry of cores 50-53. Note that each of the various portions or blocks of circuitry in apparatus 60 may be coupled to various overlapping or non-overlapping portions or subsets of bus 74. In the illustrated embodiment, L2 cache 40 is coupled to core 50 and core 51, and L2 cache 41 is coupled to core 52 and core 53. In the illustrated embodiment, interface 71 is coupled to a bus 73 that may be used to communicate external to apparatus 60. For some embodiments, apparatus 60 comprises a data processing system. For some embodiments, apparatus 60 is formed on a single integrated circuit.

In the illustrated embodiment, control circuitry 61 comprises select circuitry 62 for selecting a core to execute the thread based on the affinity for the thread and one or more characteristics of the apparatus, core affinity circuitry 63 for determining if the core has an affinity for the thread, threshold circuitry 64 for determining if the affinity for the thread exceeds a threshold, core availability circuitry 68 for determining if a core is available to execute a thread, and monitoring circuitry 69 for monitoring one or more characteristics of the apparatus which are all bi-directionally coupled to thread scheduling circuitry 67. In alternate embodiments, one or more of threshold circuitry 64, core affinity circuitry 63, and monitoring circuitry 69 may not be present. In alternate embodiments, the operating system may implement the functionality of some portions of control circuitry 61. For example, the operating system may perform the thread scheduling function instead of thread scheduling circuitry 67 which may not be implemented in apparatus 60.

In addition, in alternate embodiments, the various functional circuitry represented by blocks 62, 63, 67-69 may be partitioned and coupled in any desired and appropriate manner. Note that in one embodiment, control circuitry 61 comprises a state machine to implement one or more functions of the core availability circuitry 68, the core affinity circuitry 63, the monitoring circuitry 69, the select circuitry 62, the threshold circuitry 64, and the thread scheduling circuitry 67. In alternate embodiments, control circuitry 61 comprises random logic to implement one or more functions of the core availability circuitry 68, the core affinity circuitry 63, the monitoring circuitry 69, the select circuitry 62, the threshold circuitry 64, and the thread scheduling circuitry 67. Alternate embodiments may implement control circuitry 61 using any desired and appropriate circuitry.

In one embodiment, threshold circuitry 64 may be used for determining if the available core's affinity for the thread exceeds a threshold. The term exceeds as used herein is intended to encompass any type of circuit comparison or mathematical operation which allows the circuitry to determine whether or not a value is greater than a threshold value, is great than or equal to a threshold value, is less than a threshold value, or is less than or equal to a threshold value. For example, a determination that a threshold value is not less than or equal to an affinity or an affinity value still allows the circuitry 64 to determine whether or not the threshold value has been exceeded. Alternately, a mathematical operation which subtracts a threshold value from an affinity value and sets a flag if the result is negative still allows the circuitry 64 to determine whether or not a threshold value has been exceeded. Alternate embodiments may use a myriad of ways for comparing two values and providing a result of this comparison. All such alternate embodiments are encompassed by threshold circuitry 64 determining if the affinity for the thread exceeds a threshold.

In one embodiment, threshold circuitry 64 comprises storage circuitry for storing a power minimization threshold 65, and comprises storage circuitry for storing a performance maximization threshold 66. Alternate embodiments of threshold circuitry 64 may comprise any one or more thresholds that may represent any one or more criteria or characteristics for apparatus 60 that may be used to choose or select which core or cores 50-53 will be used to execute a thread.

Note that for one embodiment of apparatus 60, cores 50-53 execute a same instruction set. However, for alternate embodiments, one or more of cores 50-53 execute a different instruction set. The term core or processor 50-53 as used herein is intended to encompass any type of circuitry capable of executing at least a portion of a thread. Note also that other circuitry 70 may comprise one or more cores that execute the same instruction set as one or more of cores 50-53. Other circuitry 70 may additionally or alternately comprise one or more non-processor circuits used by the one or more plurality of cores 50-53 when executing a thread (e.g. other circuitry 70 may be a memory that is accessed or a peripheral device such as a timer that is utilized during execution of the thread). Other circuitry 70 may additionally or alternately comprise one or more non-processor circuits which are not used by the one or more plurality of cores 50-53 when executing a thread. Alternate embodiments may use any type of circuitry in other circuitry 70.

FIG. 3 illustrates, in block diagram form, an apparatus 60 capable of performing flow 10 of FIG. 1 in accordance with an alternate embodiment. In the illustrated embodiment of FIG. 3, apparatus 160 comprises control circuitry 161, cores 150-151, and L2 cache 140, which are bi-directionally coupled by way of bus 174. In alternate embodiments, various portions or blocks of circuitry in apparatus 160 may be coupled more or less directly. For example, in an alternate embodiment, L2 cache 140 may be bi-directionally coupled to cores 150 and 151 by way of additional conductors (not shown) other than bus 174. Note that each of the various portions or blocks of circuitry in apparatus 160 may be coupled to various overlapping or non-overlapping portions or subsets of bus 174. In the illustrated embodiment, L2 cache 140 is coupled to core 150 and core 151. In alternate embodiments, L2 cache 140 may be coupled to core 150 and not to core 151. For some embodiments, apparatus 160 comprises a data processing system. For some embodiments, apparatus 160 is formed on a single integrated circuit.

Note that in one embodiment, control circuitry 161 may be implemented using a same or a similar structure of functional blocks of circuitry (62-69) as illustrated in control circuitry 61 of FIG. 2; however, these functional blocks may have some circuit differences due to the specific manner in which various embodiments of apparatus 160 operate. In one embodiment, control circuitry 161 comprises a state machine to implement one or more functions of the core availability circuitry 68, the core affinity circuitry 63, the monitoring circuitry 69, the select circuitry 62, the threshold circuitry 64, and the thread scheduling circuitry 67. In alternate embodiments, control circuitry 161 comprises random logic to implement one or more functions of the core availability circuitry 68, the core affinity circuitry 63, the monitoring circuitry 69, the select circuitry 62, the threshold circuitry 64, and the thread scheduling circuitry 67. Alternate embodiments may implement control circuitry 161 using any desired and appropriate circuitry.

Note that for one embodiment of apparatus 160, cores 150-151 execute a same instruction set. However, for alternate embodiments, cores 150-151 execute a different instruction set. The term core or processor 150-151 as used herein is intended to encompass any type of circuitry capable of executing at least a portion of a thread. Note also that alternate embodiments of apparatus 160 may comprise additional circuitry such as other circuitry 70 and/or may comprise interface circuitry 71 and bus 73 as illustrated in FIG. 2.

Referring to both FIGS. 2 and 3, alternate embodiments may have zero, fewer, or more caches (e.g. 40-41, 140) that may each be coupled to one or more cores (e.g. 50-53, 150-151). The illustrated embodiments are just two possible embodiments. In addition, alternate embodiments may use any type of one or more caches (e.g. instruction cache, data cache, L1 cache, L2 cache, etc.)

Some example scenarios will now be described. Referring to apparatus 60 in FIG. 2 and flow 10 in FIG. 1, a first thread scheduling scenario to minimize power for single-threaded cores will now be described. Assume for this scenario that cores 50-53 are all single-threaded, that cores 50 and 51 share L2 cache 40, that cores 52 and 53 share L2 cache 41, that core 50 and L2 cache 40 are active, and that cores 51-53 as well as L2 cache 41 are inactive. The question is, if a thread without affinity for any of the cores (e.g. an affinity value of zero for each core) needs to be executed on a core, which core should be chosen if power is to be minimized? Flow 10 will choose core 51 to execute the thread since this will minimize the number of active devices to three (devices 50, 40, and 51). If core 52 or core 53 were chosen, it would have also required the activation of L2 cache 41 resulting in a total of four active devices (devices 50, 40, 41, and either 52 or 53).

Still referring to apparatus 60 in FIG. 2 and flow 10 in FIG. 1, a second thread scheduling scenario to minimize power for single-threaded cores will now be described. Assume for this scenario that cores 50-53 are all single-threaded, that cores 50 and 51 share L2 cache 40, that cores 52 and 53 share L2 cache 41, that core 50 and L2 cache 40 are active, and that cores 51-53 as well as L2 cache 41 are inactive. The question is, if a thread with affinity for core 52 (e.g. an affinity value greater than zero for core 52) needs to be executed on a core, which core should be chosen if power is to be minimized? Flow 10 will check to see if the thread's affinity for core 52 exceeds a threshold. If the thread's affinity for core 52 exceeds a threshold, then flow 10 will choose core 52 to execute the thread. Even though this results in more active devices, it still saves power since the power consumed by powering up core 52 and L2 cache 41 will be less than the power required to retrieve (i.e. from more distant memory) and load the thread's instructions and/or data into L2 cache 40 and core 51.

Still referring to apparatus 60 in FIG. 2 and flow 10 in FIG. 1, a third thread scheduling scenario to minimize power for multi-threaded cores will now be described. Assume for this scenario that cores 50-53 are all multi-threaded (e.g. each core can run two threads), that cores 50 and 51 share L2 cache 40, that cores 52 and 53 share L2 cache 41, that core 50 is running a single thread, that L2 cache 40 is active, and that cores 51-53 as well as L2 cache 41 are inactive. The question is, if a thread without affinity for any of the cores (e.g. an affinity value of zero for each core) needs to be executed on a core, which core should be chosen if power is to be minimized? Flow 10 will choose core 50 to execute the thread since this will minimize the number of active devices to two (devices 50 and 40). If core 51 was chosen as in the first thread scheduling scenario, then the number of active devices would be three. If core 52 or core 53 were chosen, it would have also required the activation of L2 cache 41 resulting in a total of four active devices (devices 50, 40, 41, and either 52 or 53).

Referring to apparatus 60 in FIG. 2 and flow 10 in FIG. 1, a fourth thread scheduling scenario to maximize performance for single-threaded cores will now be described. Assume for this scenario that cores 50-53 are all single-threaded, that cores 50 and 51 share L2 cache 40, that cores 52 and 53 share L2 cache 41, that core 50 and L2 cache 40 are active, and that cores 51-53 as well as L2 cache 41 are inactive. The question is, if a thread without affinity for any of the cores (e.g. an affinity value of zero for each core) needs to be executed on a core, which core should be chosen if performance is to be maximized? Flow 10 will choose core 52 or core 53 to execute the thread since this will maximize the number of active devices to four (devices 50, 40, 41, and either 52 or 53). If core 51 was chosen, there would be only three active devices (devices 50, 40, and 51). By choosing core 52 or core 53, the thread will have L2 cache 41 to itself instead of having to share L2 cache 40 with core 50 if core 51 had been chosen to execute the thread.

Referring to apparatus 60 in FIG. 2 and flow 10 in FIG. 1, a fifth thread scheduling scenario to maximize performance for single-threaded cores will now be described. Assume for this scenario that cores 50-53 are all single-threaded, that cores 50 and 51 share L2 cache 40, that cores 52 and 53 share L2 cache 41, that core 50 and L2 cache 40 are active, and that cores 51-53 as well as L2 cache 41 are inactive. The question is, if a thread with affinity for core 51 (e.g. an affinity value greater than zero for core 51) needs to be executed on a core, which core should be chosen if performance is to be maximized? Flow 10 will check to see if the thread's affinity for core 51 exceeds a threshold. If the thread's affinity for core 51 exceeds a threshold, then flow 10 will choose core 51 to execute the thread. Even though core 51 must share L2 cache 40 with core 50, the thread's performance is maximized since a substantial portion of its data and/or instructions still reside in L2 cache 40. Had the thread instead been executed on core 52 or core 53, the thread would have been delayed by having to retrieve (i.e. from more distant memory) and load the thread's instructions and/or data into L2 cache 41 and either core 52 or 53.

Referring now to apparatus 160 in FIG. 3 and flow 10 in FIG. 1, a sixth thread scheduling scenario to maximize performance for multi-threaded cores will now be described. Assume for this scenario that cores 150-151 are all multi-threaded (e.g. each core can run two threads), that cores 150 and 151 share L2 cache 140, that core 150 is running a single thread and thus L2 cache 140 is active, and that core 151 is inactive. The question is, if a thread without affinity for any of the cores (e.g. an affinity value of zero for each core) needs to be executed on a core, which core should be chosen if performance is to be maximized? Flow 10 will choose core 151 to execute the thread since this will maximize the number of active devices to three (devices 150, 140, and 151). If core 150 was chosen, then the number of active devices would be two (devices 150 and 140). Performance is maximized since the thread gets an entire core to itself instead of having to share if the thread had been assigned to core 150.

By now it should be appreciated that there has been provided a method and apparatus in which one or more of a plurality of processors or cores are selected to execute a thread (e.g. a software thread) based on one or more characteristics of the apparatus (e.g. power consumption, performance, etc.) and/or based on a core's affinity for the thread.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different apparatus. For example, although FIG. 2 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Also for example, in one embodiment, the illustrated elements of apparatus 60 may be circuitry located on a single integrated circuit or within a same device. Similarly, the illustrated elements of apparatus 160 may be circuitry located on a single integrated circuit or within a same device. Alternatively, apparatus 60 and 160 may include any number of separate integrated circuits or separate devices interconnected with each other. Also for example, system 60, 160 or portions thereof may be soft or code representations of physical circuitry or of logical representations convertible into physical circuitry. As such, system 60 and 160 may be embodied in a hardware description language of any appropriate type.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, in the flow diagram of FIG. 1, various steps may be performed in a different order. For example, decision diamond 18 may instead ask the question "is maximize performance selected?"; block 20 may state "minimize power is selected"; and the steps of blocks 19 and 21 may be swapped. As another example, the step described in block 15 may be performed any time before decision diamond 18 during alternate embodiments of flow 10. In addition, alternate embodiments of flow 10 may use different criteria or characteristics than thread affinity, power, and/or performance to choose which core is to execute a thread. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements. Additional Text 1. A method for example: (10) for operating an apparatus for example: (60 or 160) having a plurality of processors for example: (50-53 or 150-151), comprising:
    determining if a thread needs to be executed on one or more of the plurality of processors for example (12);
    determining if one or more of the plurality of processors is available to execute the thread, and is thus an available processor for example: (13);
    determining if the thread has an affinity for the available processor for example: (14);
    if the thread has the affinity for the available processor, selecting the available processor as a chosen processor to execute the thread for example: (17);
    if the thread does not have the affinity for the available processor, determining a number of active devices for example: (15);
    if the thread does not have the affinity for the available processor, determining if minimize power is selected for example: (18);
    if minimize power is selected, choosing a first processor of the plurality of processors to execute the thread so that the number of active devices is minimized for example: (19);
    if the thread does not have the affinity for the available processor, determining if maximize performance is selected for example: (20); and
    if maximize performance is selected, choosing a second processor of the plurality of processors to execute the thread so that the number of active devices is maximized for example: (21).

2. A method as in statement 1, wherein said step of determining the number of active devices comprises:
    monitoring one or more power states of the apparatus for example: (15).

3. A method as in statement 1, wherein said step of determining the number of active devices comprises:
    monitoring one or more performance states of the apparatus for example: (15).

4. A method as in statement 1, further comprising:
    if the thread has the affinity for the available processor, determining if the affinity exceeds a threshold for example: (16).

5. A method as in statement 1, further comprising:
    executing the thread for example: (22).

6. A method as in statement 1, wherein the active devices for example: (40-41, 50-53, 70-71, 150-151, 140) comprise one or more of the plurality of processors for example: (50-53, 150-151).

7. A method as in statement 1, wherein the active devices comprise one or more caches for example: (40-41, 140).

8. A method as in statement 1, wherein the active devices comprise one or more non-processor circuitry for example: (70) used by the one or more plurality of processors.

9. A method as in statement 1, wherein the one or more plurality of processors for example: (50-53, 150-151) comprise one or more cores executing a same instruction set.

10. An apparatus for example: (60 or 160), comprising:
    a plurality of processors for example: (50-53 or 150-151); and
    control circuitry for example: (61 or 161), coupled to the plurality of processors, said control circuitry comprising:
        core availability circuitry for example: (68) for determining if a core is available to execute a thread;
        core affinity circuitry for example: (63) for determining if the core has an affinity for the thread;
        monitoring circuitry for example: (69) for monitoring one or more characteristics of the apparatus; and
        select circuitry for example: (62) for selecting one or more of the plurality of processors to execute the thread based on the affinity for the thread and the one or more characteristics of the apparatus.

11. An apparatus as in statement 10, wherein the control circuitry further comprises:
    threshold circuitry for example: (64) for determining if the affinity for the thread exceeds a threshold.

12. An apparatus as in statement 10, wherein the threshold circuitry for example: (64) comprises:
    storage circuitry for example: (65) for storing a power minimization threshold.

13. An apparatus as in statement 10, wherein the threshold circuitry for example: (64) comprises:
    storage circuitry for example: (66) for storing a performance maximization threshold.

14. An apparatus as in statement 10, further comprising:
    a cache for example: (40-41, 140), coupled to one or more of the plurality of processors for example: (50-53, 150-151).

15. An apparatus as in statement 14, wherein the cache for example: (40-41, 140) is coupled to operate with two or more of the plurality of processors.

15. An apparatus as in statement 10, wherein the one or more characteristics of the apparatus comprises performance of the apparatus.

16. An apparatus as in statement 10, wherein the one or more characteristics of the apparatus comprises power usage of the apparatus.

17. An apparatus, comprising:
    a plurality of processors for example: (50-53, 150-151); and
    control circuitry for example: (61), coupled to the plurality of processors, said control circuitry comprising:
        core availability circuitry for example: (68) for determining if a core is available to execute a thread;
        core affinity circuitry for example: (63) for determining if the core has an affinity for the thread;
        monitoring circuitry for example: (69) for monitoring performance of the apparatus and for monitoring power usage of the apparatus;
        select circuitry for example: (62) for selecting one or more of the plurality of processors to execute the thread based on a selection criteria, said selection criteria comprising the affinity for the thread, a performance of the apparatus, and a power usage of the apparatus;
        threshold circuitry for example: (64) for determining if the affinity for the thread exceeds a threshold; and
        thread scheduling circuitry for example: (67), coupled to the core availability circuitry for example: (68), coupled to the core affinity circuitry for example: (63), coupled to the monitoring circuitry for example: (69), coupled to the select circuitry for example: (62), coupled to the monitoring circuitry for example: (69), coupled to the select circuitry for example: (62), and coupled to the threshold circuitry for example: (64), said thread scheduling circuitry for example: (67) scheduling the thread for execution.

18. An apparatus as in statement 17, wherein the control circuitry for example: (61) comprises a state machine to implement one or more functions of the core availability circuitry for example: (68), the core affinity circuitry for example: (63), the monitoring circuitry for example: (69), the select circuitry for example: (62), the threshold circuitry for example: (64), and the thread scheduling circuitry for example: (67).

19. An apparatus as in statement 17, wherein the control circuitry for example: (61) comprises software to implement one or more functions of the core availability circuitry for example: (68), the core affinity circuitry for example: (63), the monitoring circuitry for example: (69), the select circuitry for example: (62), the threshold circuitry for example: (64), and the thread scheduling circuitry for example: (67).

20. An apparatus as in statement 17, wherein the threshold circuitry for example: (64) comprises:
    storage circuitry for example: (65) for storing a power minimization threshold; and
    storage circuitry for example: (66) for storing a performance maximization threshold.

What is claimed is:

1. A method for operating an apparatus having a plurality of processors, comprising:
    determining if a thread needs to be executed on one or more of the plurality of processors;
    determining if one or more of the plurality of processors is available to execute the thread, and is thus an available processor;
    determining if the thread has an affinity for the available processor, wherein said determining if the thread has the affinity for the available processor comprises
        counting a number of writes by one or more other threads to a cache associated with the available processor since the thread was last executed on the available processor;
    if the thread has the affinity for the available processor, selecting the available processor as a chosen processor to execute the thread;
    if the thread does not have the affinity for the available processor, determining a number of active devices;
    if the thread does not have the affinity for the available processor, determining if minimize power is selected;
    if minimize power is selected, choosing a first processor of the plurality of processors to execute the thread so that the number of active devices is minimized;
    if the thread does not have the affinity for the available processor, determining if maximize performance is selected; and
    if maximize performance is selected, choosing a second processor of the plurality of processors to execute the thread so that the number of active devices is maximized.

2. A method as in claim 1, wherein said step of determining the number of active devices comprises:
    monitoring one or more power states of the apparatus.

3. A method as in claim 1, wherein said step of determining the number of active devices comprises:
    monitoring one or more performance states of the apparatus.

4. A method as in claim 1, further comprising:
    if the thread has the affinity for the available processor, determining whether the affinity is less than a threshold; and
    indicating that the thread does not have the affinity for the available processor if the affinity is less than the threshold.

5. A method as in claim 1, further comprising:
    executing the thread.

6. A method as in claim 1, wherein the active devices comprise one or more of the plurality of processors.

7. A method as in claim 1, wherein the active devices comprise one or more caches.

8. A method as in claim 1, wherein the active devices comprise one or more non-processor circuitry used by the one or more plurality of processors.

9. A method as in claim 1, wherein the one or more plurality of processors comprise one or more cores executing a same instruction set.

10. An apparatus, comprising:
    a plurality of processors; and
    control circuitry, coupled to the plurality of processors, said control circuitry comprising:
        core availability circuitry for determining if a core is available to execute a thread;
        core affinity circuitry for determining if the core has an affinity for the thread, wherein said determining if the core has an affinity for the thread comprises counting a number of writes by one or more other threads to a cache associated with the core since the thread was last executed by the core;
        monitoring circuitry for monitoring one or more characteristics of the apparatus; and
        select circuitry for selecting one or more of the plurality of processors to execute the thread based on the affinity for the thread and the one or more characteristics of the apparatus.

11. An apparatus as in claim 10, wherein the control circuitry further comprises:
    threshold circuitry for determining whether the affinity for the thread is less than a threshold; and
    circuitry indicating that the core does not have the affinity for the thread if the affinity is less than the threshold.

12. An apparatus as in claim 10, wherein the threshold circuitry comprises:
    storage circuitry for storing a power minimization threshold.

13. An apparatus as in claim 10, wherein the threshold circuitry comprises:
    storage circuitry for storing a performance maximization threshold.

14. An apparatus as in claim 10, further comprising:
    a cache, coupled to one or more of the plurality of processors.

15. An apparatus as in claim 14, wherein the cache is coupled to operate with two or more of the plurality of processors.

16. An apparatus as in claim 10, wherein the one or more characteristics of the apparatus comprises power usage of the apparatus.

17. An apparatus, comprising:
    a plurality of processors; and
    control circuitry, coupled to the plurality of processors, said control circuitry comprising:
        core availability circuitry for determining if a core is available to execute a thread;
        core affinity circuitry for determining if the core has an affinity for the thread, wherein said determining if the core has the affinity for the thread comprises counting a number of writes by one or more other threads to a cache associated with the core since the thread was last executed by the core;
        monitoring circuitry for monitoring performance of the apparatus and for monitoring power usage of the apparatus;
        select circuitry for selecting one or more of the plurality of processors to execute the thread based on a selection criteria, said selection criteria comprising the affinity for the thread, a performance of the apparatus, and a power usage of the apparatus;

threshold circuitry for determining if the affinity for the thread exceeds a threshold; and thread scheduling circuitry, coupled to the core availability circuitry, coupled to the core affinity circuitry, coupled to the monitoring circuitry, coupled to the select circuitry, coupled to the monitoring circuitry, coupled to the select circuitry, and coupled to the threshold circuitry, said thread scheduling circuitry scheduling the thread for execution.

18. An apparatus as in claim 17, wherein the control circuitry comprises a state machine to implement one or more functions of the core availability circuitry, the core affinity circuitry, the monitoring circuitry, the select circuitry, the threshold circuitry, and the thread scheduling circuitry.

19. An apparatus as in claim 17, wherein the control circuitry comprises software to implement one or more functions of the core availability circuitry, the core affinity circuitry, the monitoring circuitry, the select circuitry, the threshold circuitry, and the thread scheduling circuitry.

20. An apparatus as in claim 17, wherein the threshold circuitry comprises:

storage circuitry for storing a power minimization threshold; and storage circuitry for storing a performance maximization threshold.

* * * * *